United States Patent [19]

Mumford et al.

[11] Patent Number: 5,593,770
[45] Date of Patent: Jan. 14, 1997

[54] CHEMORHEOLOGICALLY TAILORED MATRIX RESIN FORMULATIONS CONTAINING ANHYDRIDE CURING AGENTS

[75] Inventors: Neal A. Mumford; Rolf M. Johns; Ben A. Lloyd, all of Brigham City; Cheng-Chi Chen, Salt Lake City, all of Utah

[73] Assignee: THiokol Corporation, Ogden, Utah

[21] Appl. No.: 195,301

[22] Filed: Feb. 14, 1994

Related U.S. Application Data

[63] Continuation-in-part of Ser. No. 81,839, Jun. 23, 1993, Pat. No. 5,356,499, which is a continuation of Ser. No. 426,890, Oct. 25, 1989, abandoned.

[51] Int. Cl.$^6$ ................................................. B32B 27/00
[52] U.S. Cl. .......................... 428/290; 428/396; 428/245
[58] Field of Search ................................ 428/260, 290, 428/245, 253, 396

[56] References Cited

U.S. PATENT DOCUMENTS

| | | | |
|---|---|---|---|
| 2,824,083 | 2/1958 | Parry et al. | 260/47 |
| 2,904,530 | 9/1959 | Steckler et al. | 260/47 |
| 2,909,494 | 10/1959 | Parry et al. | 260/18 |
| 3,317,470 | 5/1967 | Cofer | 260/47 |
| 3,403,199 | 9/1968 | Ramos | 260/830 |
| 3,454,421 | 7/1969 | Westbrook | 117/126 |
| 3,488,404 | 1/1970 | Parker, Jr. | 260/830 |
| 3,546,169 | 12/1970 | Cole | 260/47 |
| 3,647,702 | 3/1972 | Cole | 252/182 |
| 3,725,502 | 4/1973 | Bernheim et al. | 260/830 TW |
| 3,728,302 | 4/1973 | Helm | 260/37 EP |
| 3,784,647 | 1/1974 | Fleming et al. | 260/830 |
| 3,829,354 | 8/1974 | Bertram et al. | 161/88 |
| 3,914,204 | 10/1975 | Helm et al. | 260/47 EN |
| 3,983,289 | 9/1976 | Nishizaki et al. | 428/268 |
| 4,088,633 | 5/1978 | Gurney | 260/47 |
| 4,117,361 | 9/1978 | Smith et al. | 310/208 |
| 4,197,389 | 4/1980 | Becker et al. | 528/103 |
| 4,262,109 | 4/1981 | Englin et al. | 528/104 |
| 4,330,659 | 5/1982 | King et al. | 528/99 |
| 4,340,713 | 7/1982 | Davis et al. | 528/89 |
| 4,366,108 | 12/1982 | Urech et al. | 264/137 |
| 4,447,586 | 5/1984 | Shimp | 525/504 |
| 4,479,984 | 10/1984 | Levy et al. | 427/54.1 |
| 4,481,349 | 11/1984 | Marten et al. | 528/120 |
| 4,487,948 | 12/1984 | Shimp et al. | 549/552 |
| 4,521,583 | 6/1985 | Kohli | 528/119 |
| 4,607,069 | 8/1986 | Tesch et al. | 523/400 |
| 4,652,492 | 3/1987 | Seiner et al. | 428/414 |
| 4,668,758 | 5/1987 | Corley | 528/91 |
| 4,683,282 | 7/1987 | Goel | 528/91 |
| 4,683,284 | 7/1987 | Goel | 528/93 |
| 4,701,378 | 10/1987 | Bagga et al. | 428/414 |
| 4,775,736 | 10/1988 | Wiggins | 528/91 |
| 4,892,764 | 1/1990 | Drain et al. | 428/34.5 |
| 4,956,411 | 9/1990 | Tada et al. | 528/93 |
| 4,977,214 | 12/1990 | Bagga | 525/109 |
| 4,985,530 | 1/1991 | Murakami et al. | 528/103 |
| 5,011,721 | 4/1991 | Decker et al. | 428/36.9 |
| 5,017,674 | 5/1991 | Tada et al. | 528/93 |
| 5,025,078 | 6/1991 | Lucas et al. | 528/120 |
| 5,049,639 | 9/1991 | Storey et al. | 528/120 |
| 5,053,475 | 10/1991 | Tada et al. | 528/98 |
| 5,061,779 | 10/1991 | Wang | 528/98 |
| 5,091,474 | 2/1992 | Murakami et al. | 525/109 |
| 5,227,452 | 7/1993 | Earls et al. | 528/96 |
| 5,296,570 | 3/1994 | Earls et al. | 525/481 |
| 5,310,770 | 5/1994 | DeGooyer et al. | 523/414 |

*Primary Examiner*—Christopher W. Raimund
*Attorney, Agent, or Firm*—Madson & Metcalf; Ronald L. Lyons

[57] ABSTRACT

Chemorheologically viscosity tailored matrix resin formulations for use in forming prepregs and composite articles are disclosed. These formulations have a specified viscosity profile obtained from a curable matrix resin and an effective amount of a reactive resin curing agent reactive at room temperature and a latent resin curing agent substantially nonreactive at room temperature. The latent resin curing agent is activated upon heating or radiation. The matrix resin formulation is adapted upon formulation to have a viscosity sufficiently low enough to enable the matrix resin to impregnate fibers or broadgoods at room temperature without the necessity for the application of heat or solvent and which, upon standing at room temperature after impregnation into the fibers or broadgoods to form a prepreg composition, rises in viscosity. The matrix resin in the prepreg experiences a reduction in viscosity upon heating to a viscosity minimum sufficiently low to allow the matrix resin to flow and substantially eliminate formation of voids in the composite article from said prepreg yet not so low as to permit excessive bleeding of the matrix resin from the prepreg. With continued heating, the matrix resin in the composite article cures to a hardened or gelled state.

9 Claims, 3 Drawing Sheets

CHEMORHEOLOGICALLY TAILORED MATRIX RESIN FORMULATIONS CONTAINING ANHYDRIDE CURING AGENTS

RELATED APPLICATION

This application is a continuation-in-part of application Ser. No. 08/081,839, filed Jun. 23, 1993, entitled "Method For Increasing Fiber Strength Translation In Composite Pressure Vessels Using Matrix Resin Formulations Containing Surface Active Agents" now U.S. Pat. No. 5,356,499, which is a continuation of application Ser. No. 07/426,890, filed Oct. 25, 1989, now abandoned, both of which are incorporated herein by this reference.

BACKGROUND OF THE INVENTION

1. The Field of the Invention

This invention relates to matrix resins formulations and pre-impregnated fibers and composite articles formed from said matrix resins formulations wherein the matrix resin formulations are chemorheologically tailored. The invention is also related to methods for producing and using said chemorheologically tailored resin and pre-impregnated fiber formulations to form composite articles.

2. Technical Background

Solid propellant rocket motor cases for missile systems, spacecraft boosters and other types of large and small high performance, lightweight pressure vessels are commonly made from fiber reinforcement and various formulations of poly-epoxide resins (epoxy resins) by a filament winding process. Similarly, filament winding with both polyesters and epoxy resins has made possible production of lightweight tanks, poles, piping and the like. Historically, fiberglass has been the most common reinforcement fiber. Recently other fibers such as carbon filaments, boron filaments, and high modulus organic polymer filaments, most significantly aramid filaments, have become increasingly useful in these composite structures to take advantage of their differing and sometimes unique physical properties.

The resins utilized are typically epoxy formulations based on diglycidyl ether-bisphenol A (DGEBA), reactive low molecular weight epoxy diluents, and curing agents such as aliphatic and aromatic amines and carboxylic acid anhydrides. Both flexibilized and rigid epoxy resins have been used as matrix resins for filament wound composite structures.

In providing composite articles, such as pressure vessels, either wet winding or prepreg processes have been employed. In wet winding process, the fiber is run through a resin bath containing the resin composition whereby the fiber is coated with the composition. The resulting resin-fiber combination is then wound directly into the desired structure. The structures are then cured by polymerization initiated by heat or radiation. On the other hand, if a prepreg is to be used, the fiber or "tape" is impregnated with a curable resin composition and then wound on a spool. This prepreg is stored for winding at a future time. When the prepreg is converted into a composite article, the prepreg is typically cured by polymerization initiated by heat or radiation.

The present invention provides matrix resin formulations which are especially suitable as prepreg compositions. A prepreg is composed of a reinforcing fiber and a curable resin matrix. The prepreg is generally in one of the forms referred to as tow, roving, tape, mats, fabric, broadgoods, and the like. In the past, the preparation of prepreg materials has been time consuming and expensive, especially for long-working-life prepreg. By long-working-life prepreg is meant a prepreg whose handling properties do not change significantly over thirty days in normal room handling conditions.

In order to obtain and use such long-working-life prepreg, constraints at four stages in the processing sequence must be taken into consideration. These stages include: impregnation and spooling; filament winding or lay-up; cure minimum; and ultimate or post-cure of the composite article.

During impregnation, the resin formulation must have a viscosity low enough so that it will thoroughly and evenly penetrate fiber bundles containing many thousands of filaments. For these purposes viscosities are typically under 5,000 centipoise (cp). Spooling requires high enough viscosity so that the resin does not squeeze out as the fiber is spooled. A nominal spooling viscosity for graphite fibers is generally about 1,000 cp.

Two constraints operate on resin viscosity during filament winding or lay-up. The resin must have low enough viscosity so that the prepreg conforms to, or wets the surface, minimizing interlaminar voids. Resin viscosity must be high enough that minimum viscosity during cure does not go below about 500 cp. While these constraints leave a broad range for acceptable viscosities, the cure minimum of 500 cp usually precludes the use of heat-cured resins whose room temperature viscosity is 5,000 cp or less. A resin with a room temperature viscosity of 5,000 cp would fall far below 500 cp during heated cure. Therefore, a desirable resin property is to have the viscosity rise between spooling and use.

Techniques used to cure a matrix material often temporarily reduce its viscosity. Heated cure of typical epoxy prepreg resins can reduce their viscosity by several orders of magnitude for periods of minutes to hours. If viscosity falls too low, matrix material bleeds from a curing part, compromising its reproducibility and quality. While it is important that the matrix viscosity not fall too low during cure, it is also typically important that it becomes liquid. Failure of the matrix material to melt and/or flow can be the source of void and delamination defects in composite parts.

After the cure minimum or gelatin, the chemical reactions involved in curing a matrix resin progress, raising the crosslink density and mechanical properties to the level required for use of the composite part.

Solution dilution impregnation and hot-melt impregnation techniques have conventionally been employed to prepare long-working-life prepregs. In solution impregnation, a matrix resin with a viscosity of greater than 5,000 cp is diluted with a solvent to a viscosity of less than 5,000 cp. The fiber is impregnated with this diluted resin. Solvent is then removed by heating and evaporation before the prepreg is spooled. Problems with this approach include the environmental regulation requirement that the solvent be recovered, the associated expense, and the inevitable residual solvent in the matrix resin.

In hot-melt impregnation a matrix resin with a room temperature viscosity greater than 5,000 cp is heated to a temperature where its viscosity is less than 5,000 cp. Fiber is impregnated with the matrix resin at that temperature, the prepreg is cooled, and then spooled. Problems with this approach include the need for matrix heating equipment raising viscosity of the matrix resin due to heat-induced polymerization during impregnation.

Moreover, after the resin-fiber prepreg has been spooled, in each of these processes, the prepreg must generally be stored under refrigerated conditions to prevent resin advancement and loss of tack and drape needed for processing to ensure adequate flow during the heated cure of the articles made therefrom. Such curing would prevent its use in winding or forming composite articles.

It would therefore be desirable if a matrix material or resin formulation could be provided that would go through the desired viscosity profile at room temperature and do so without requiring solvent dilution or hot-melt impregnation of fibers. It would also be desirable to spool the prepreg at room temperature immediately after impregnation of the fiber, without requiring either solvent removal or cooling of the prepreg.

It is also desirable that, after impregnation, the viscosity of the matrix rises and then levels off at a viscosity level planned for room temperature storage and later use of the prepreg. This would allow for a long term room temperature storage of the prepreg and also for a long-working-life. It would also be desirable that when the prepreg is used to form a composite article, it goes to a viscosity minimum and then gels, cures or hardens like a typical prepreg. Also, it is desirable that the matrix processing viscosity be controlled by chemical formulation rather than by solvents or heated impregnation equipment.

Such methods are disclosed and claimed herein.

SUMMARY OF THE INVENTION

In accordance with the present invention, the matrix material or resin is chemorheologically tailored by matching the handling characteristics of the matrix material at normal handling temperature with the preparation or use operation being performed at that time. That is, the matrix material and prepreg formed therefrom are formulated to go through the required viscosity profile at room temperature. The matrix material or resin formulation at mix and during impregnation at room temperature will have a viscosity of below about 5,000 cp, and preferably in the range of from about 500 to about 1,000 cp. The matrix resin formulation is used at this viscosity to impregnate continuous fiber strands, fabrics, or tapes to form a prepreg composition which is immediately spooled in the same operation at essentially the same viscosity.

After impregnation, the viscosity of the matrix resin rises to the level desired for the prepreg composition (to above about 50,000 cp), and levels off at the viscosity tailored to the particular tack, drape and flow desired by the user. This permits long-term room temperature storage and long-working-life for the prepreg composition.

Subsequently, the prepreg may be subjected to heating or radiation for forming a composite article. Upon the application of heat or radiation, the matrix material in the prepreg composition proceeds to a viscosity minimum in the range of from about 500 to about 500,000 cp, and then gels or sets like a typical prepreg formed composite article. According to this invention, the matrix material processing viscosity is controlled by chemical formulation (chemorheologically tailoring) rather than by the use of solvents or heated impregnation equipment.

A combination of matrix resin ingredients is employed to provide a formulation of a viscosity at room temperature of less than about 5,000 cp. The formulation contains both a reactive hardener or curing agent and a latent hardener or curing agent. The reactive curing agent is one which is reactive (either alone or in the presence of a catalyst) at or near room temperature. The reactive curing agent functions as a viscosity builder to raise the viscosity of the matrix resin formulation after impregnation of the fiber to a viscosity at least about 50,000 cp, and generally to within the range of from about 50,000 to about 10,000,000 cp. This produces a long-working-life prepreg composition whose handling properties do not change significantly over at least about thirty days or more at room temperature.

The reactive curing agent includes an anhydride functional group according to the present invention. It has been found that the use of an anhydride reactive curing agent permits the chemorheologically viscosity tailored matrix resin formulations to have a long impregnation pot-life followed by a quick viscosity build-up. A low initial viscosity and a wide range of plateau viscosities is available using anhydrides.

The latent hardener or curing agent in the matrix resin formulation is relatively unreactive at room temperature, but causes rapid curing of the matrix when heated or radiated. The latent curing agent is sufficiently unreactive that the matrix resin formulation will be substantially stable at room temperature, and upon heating, allow the viscosity of the prepreg composition to decrease sufficiently to allow resin flow. This reduces voids and delaminations in composite articles made therefrom. The viscosity is not so low, however, as to cause excessive resin bleed from the composite article, i.e. generally to a viscosity of from about 500 to about 30,000 cp. This provides for good knitting between plies of the wound prepreg strands, plies of tape, or plies of fabric and avoids resin-starved conditions arising from excess resin bleed.

These general characteristics are discussed in U.S. Pat. No. 5,011,721 to Decker, et al., entitled Chemorheologically Tailored Matrix Resin Formulations and Their Use In Making Pre-Impregnated Fibers and In Fabricating Composite Parts, Issued Apr. 30, 1991, which patent is incorporated herein by this reference.

BRIEF DESCRIPTION OF THE DRAWINGS

In order to more fully understand the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
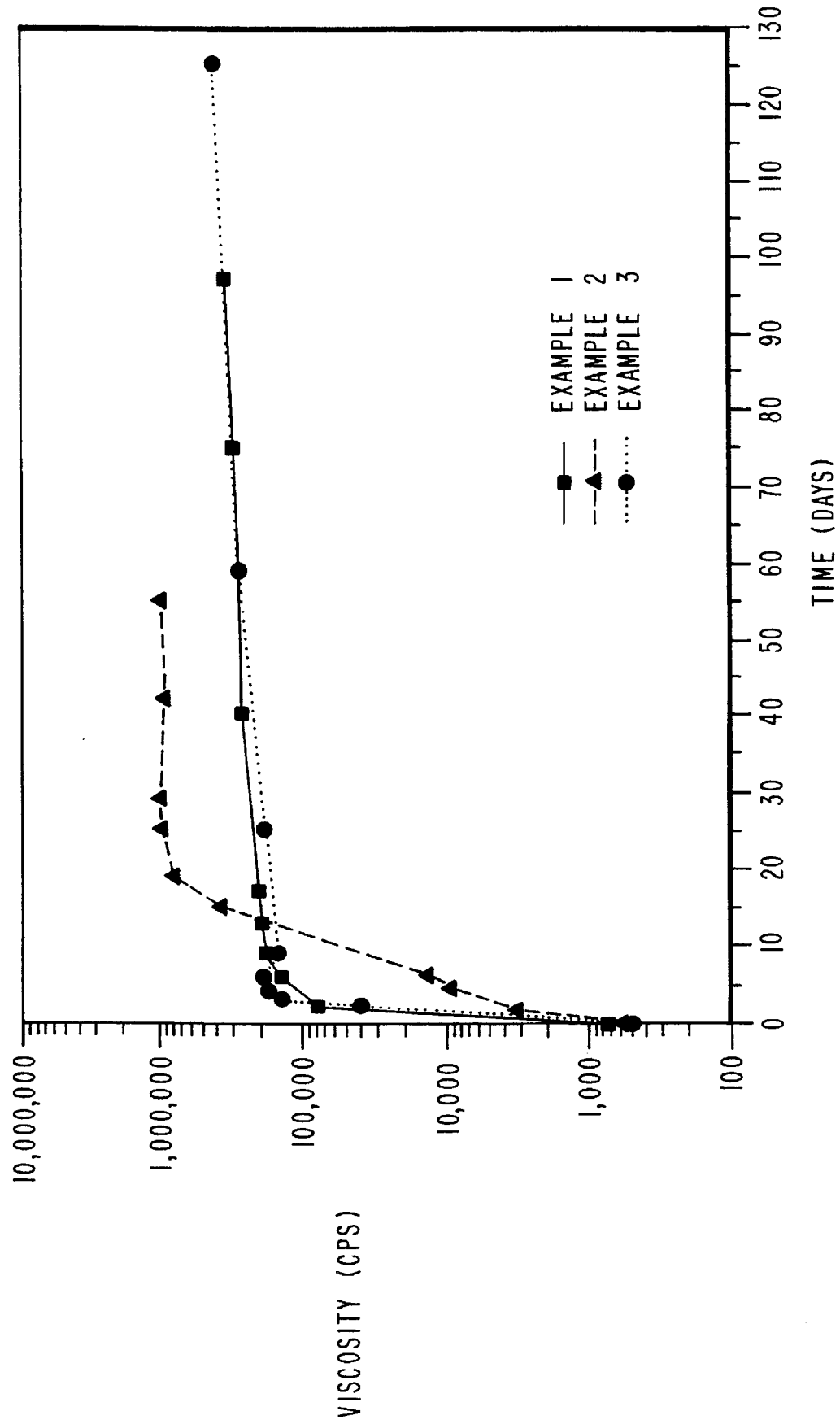
FIG. 1 is a graphical illustration of the viscosity profiles (viscosity vs. time) of the compositions described in Examples 1–3.

The present invention provides means for avoiding the highly undesirable features previously required to prepare and store long-working-life prepreg compositions by the solution impregnation and hot-melt impregnation processes. As mentioned above, in the solvent dilution impregnation process, a matrix material formulation (neat resin) having a room temperature viscosity of greater than 5,000 cp is required to be diluted with a solvent to a viscosity of less than 5,000 cp in order for the fiber to be impregnated with the diluted matrix resin. Thereafter, the solvent is removed by heating and evaporation before the prepreg is spooled.

In contrast to known methods, the improved process and formulations of this invention utilize matrix resin formulations having initial room temperature viscosities of less than about 5,000 cp without solvent dilution or heating thereof.

The matrix resin formulation containing both a reactive and latent curing agent is mixed, the fiber is impregnated with the resin formulation, and the resulting prepreg is then spooled substantially immediately, all at room temperature. The matrix resin will increase in viscosity at room temperature, due primarily to the action of the reactive curing agent, until the viscosity plateaus. The plateau viscosity is high enough to prevent bleeding of matrix resin from the prepreg due to winding tension, yet low enough to allow tack and drape in the prepreg so that it nestles and seats during its subsequent use in winding a composite article. The plateau viscosity is preferably greater than 50,000 cp, and usually from about 50,000 cp to about 10,000,000 cp, although in some cases very high plateau viscosities (>10,000,000) may be preferred.

For forming the chemorheologically viscosity tailored matrix resin formulations, any suitable curable matrix resin may be employed. Typical resins include epoxy resins, especially those based on diglycidyl ethers of bisphenol A. Examples of suitable matrix resins include, for example, alicyclic diepoxide carboxylate resins such as Ciba-Geigy's CY-179 epoxy resin; diglycidyl ether-bisphenol A epoxy resins such as Dow Chemical Co.'s DER 332, DER 383 and DER 661 and Shell Chemical Co.'s EPON 826 and EPON 828; 1,4-butanediol glycidyl ether such as Celanese Chemical Co.'s Epi-Rez 5022; polyglycol diepoxide resin such as Dow Chemical Co.'s DER 732; a bisphenol F/epichlorohydrin epoxy resin such as Shell Chemical Co.'s DPL 862; an epichlorohydrin/tetraphenol ethane epoxy resin such as Shell Chemical Co.'s EPON 1031, and mixtures thereof.

The base resin of the matrix resin formulation will have incorporated therein a reactive curing agent and a latent curing agent as defined hereinbefore. A single reactive curing agent or a mixture of reactive curing agents may be employed. Similarly, a single latent curing agent or a mixture of latent curing agents may be employed. The curing agents are employed in amounts effective to cure the matrix resin in the desired manner as indicated above, i.e. an amount of reactive curing agent to provide a matrix resin formulation with a room temperature viscosity of less than about 5,000 cp and which cure the prepreg at room temperature to a viscosity plateau of at least about 50,000 cp, and an amount of latent curing agent to effectively permit the matrix resin in the prepreg composition to initially decrease to a viscosity of about 500 to about 500,000 cp upon heating and thereafter to completely cure the matrix resin in the composite article. Generally, the curing agents will be present in the matrix resin formulation in an amount of from about 1% to about 12% by weight based on the weight of the base resin present in the matrix resin formulation when the latent curing agent is catalytic (such as a blocked Lewis acid). When other latent curing agents are used, the amount present will be up to 40% by weight.

Any suitable reactive curing agent for the matrix resin may be employed to produce the viscosity profile desired. Examples of reactive curing agents according to the present invention include aliphatic, cycloaliphatic, and aromatic anhydrides such as methyltetrahydrophthalic anhydride, nadic methyl anhydride, methylhexahydrophthalic anhydride and maleic anhydride, and mixtures thereof.

Examples of latent hardeners or curing agents include blocked Lewis acids such as boron trifluoride complexes, boron trichloride complexes, specifically boron trifluoride monoethylamine, tertiary amines and their salts, imidazoles or latent amines such as dicyandiamide, or ureas such as 2,4-toluene-1,1'-bis(3,3 dimethyl urea), and mixtures thereof.

Once the matrix resin formulations are produced, they may be employed to produce prepreg compositions of this invention by impregnating fibers, filaments, tapes, mats, broadgoods, and other similar fiber-based materials commonly used in the art. A wide variety of fibers or filaments are known in the filament winding art and may be used in this invention. These fibers and filaments include, but are not limited to, glass fibers, boron filaments, boron nitride, silicon carbide, graphite (carbon) filaments and high modulus organic filaments, particularly organic filaments of the nylon, polyethylene and aramid type. Examples of high modulus organic filaments include, but are not limited to, poly(benzothiazoles) and poly(aromatic amides) which are commonly referred to simply as "aramids". Aramids include poly(benzamides) and the family of aramid fibers sold by E.I. DuPont under the trademark KEVLAR®. As an example of carbon filaments useful in this invention, there may be mentioned, for example, Amoco Performance Product's T40 and Toray's T-800H and T-1000G carbon fibers.

Once a prepreg has been produced from the chemorheologically viscosity tailored matrix resin formulations of this invention, filament wound composites can be made by filament winding techniques known in the art. The ultimate cure cycle employed for curing of the composite article will depend upon the particular latent curing agents in the resin system. Generally, a multihour cure at elevated temperature is used. Typically, a 5–30 hour cure cycle at temperatures gradually increasing from room temperature to about 130° C. or higher is employed. Faster acting catalysts and/or initiators can be used to shorten the cure cycle, but may also result in an undesirably shorter room temperature shelf-life.

As indicated previously, prepregs can be prepared from the chemorheologically tailored matrix resin formulations of this invention and fibers or filaments. Fiber impregnation can be done by any one of a number of standard procedures for room temperature impregnation of dry fibers with neat matrix resins. These techniques include, but are not limited to, dip tanks, funnel print blocks, hand painting, and immersion. Features important to prepreg quality are the resin penetration of the fiber bundles to wet the individual filaments, and assuring that an amount of resin equal to the preferred resin content of the final product prepreg be applied to the fiber. The low initial viscosity of chemorheologically tailored resins simplifies this procedure.

Room temperature resin migration in the prepreg is eliminated as the viscosity of the resin builds. As the room temperature viscosity rises, the cure minimum viscosity also rises, enough to minimize resin migration or bleed during cure. The long-working-life prepregs produced by this process can be stored, shipped and used without refrigeration with insignificant changes in material processing properties.

In order to test the effectiveness of a resin for filament winding, certain standard structures can be fabricated. They include NOL (Naval Ordinance Lab) rings, cylinders and pressure vessels (bottles), the latter being considered the best indication of resin effects. Composite articles fabricated from prepregs prepared from chemorheologically viscosity tailored resins of this invention have similar properties to composite articles prepared in other ways.

The chemorheologically viscosity tailored matrix resin formulations of this invention may also have present in the formulations other Optional ingredients such as surfactants, coupling agents, flow control agents and the like which do not adversely affect the functional viscosity profile of the formulations.

EXAMPLES

The following examples are given to illustrate various embodiments which have been made or may be made in accordance with the present invention. These examples are given by way of example only, and it is to be understood that the following examples are not comprehensive or exhaustive of the many types of embodiments of the present invention which can be prepared in accordance with the present invention.

Example 1

A 2.5 g portion of DY-9577 (a boron trichloride-amine complex from Ciba-Geigy Co.) was heated in a 200 ml beaker at 40°–50° C. for ten minutes to produce a liquid. To the liquid were added 50 g of CY-184 epoxy and 3.0 g of isophorone diamine at room temperature with subsequent thorough mixing. The resulting solution had an initial viscosity of 750 cp at room temperature (24° C.) and a viscosity of 4,930 cp, after 6 hours at room temperature. The solution had a pot-life (time for doubling of viscosity) of about 2 hours. The plateau viscosity was 141,000 cp after 7 days at room temperature, a suitable viscosity for filament winding when impregnated on fiber. Viscosity profile of this resin is shown in FIG. 1 (with the symbol ■).

Example 2

A 2.5 g portion of DY-9577 was heated in a 200 ml beaker at 40°–50° C. for ten minutes to produce a liquid. To the liquid were added 50 g of CY-184 epoxy, and 8.5 g of methyltetrahydrophthalic anhydride at room temperature with subsequent mixing. The resulting solution had an initial viscosity of 610 cp at room temperature. The plateau viscosity was 832,000 cp after 20 days at room temperature, a suitable viscosity for filament winding when impregnated on fiber. Viscosity profile of this resin is shown in FIG. 1 (with the symbol ▲.) The system has a pot-life of about 10 hours.

Example 3

A 3.6 g portion of DY-9577 was heated in a 200 ml beaker at 40°–50° C. for ten minutes to produce a liquid. To the liquid were added 60 g of MY-510 and 8.0 g of CY-179, and a solution of 10.9 g of methyltetrahydrophthalic anhydride and 0.3 g of triphenylphosphine at room temperature with subsequent mixing. The resulting solution had an initial viscosity of 520 cp at room temperature. The plateau viscosity was 176,000 cp after 5 days at room temperature, a suitable viscosity for filament winding when impregnated with fiber. Viscosity profile of this resin is shown in FIG. 1 (with the symbol ●). The pot-life of this system is about 2 hours.

Example 4

Figure 2:
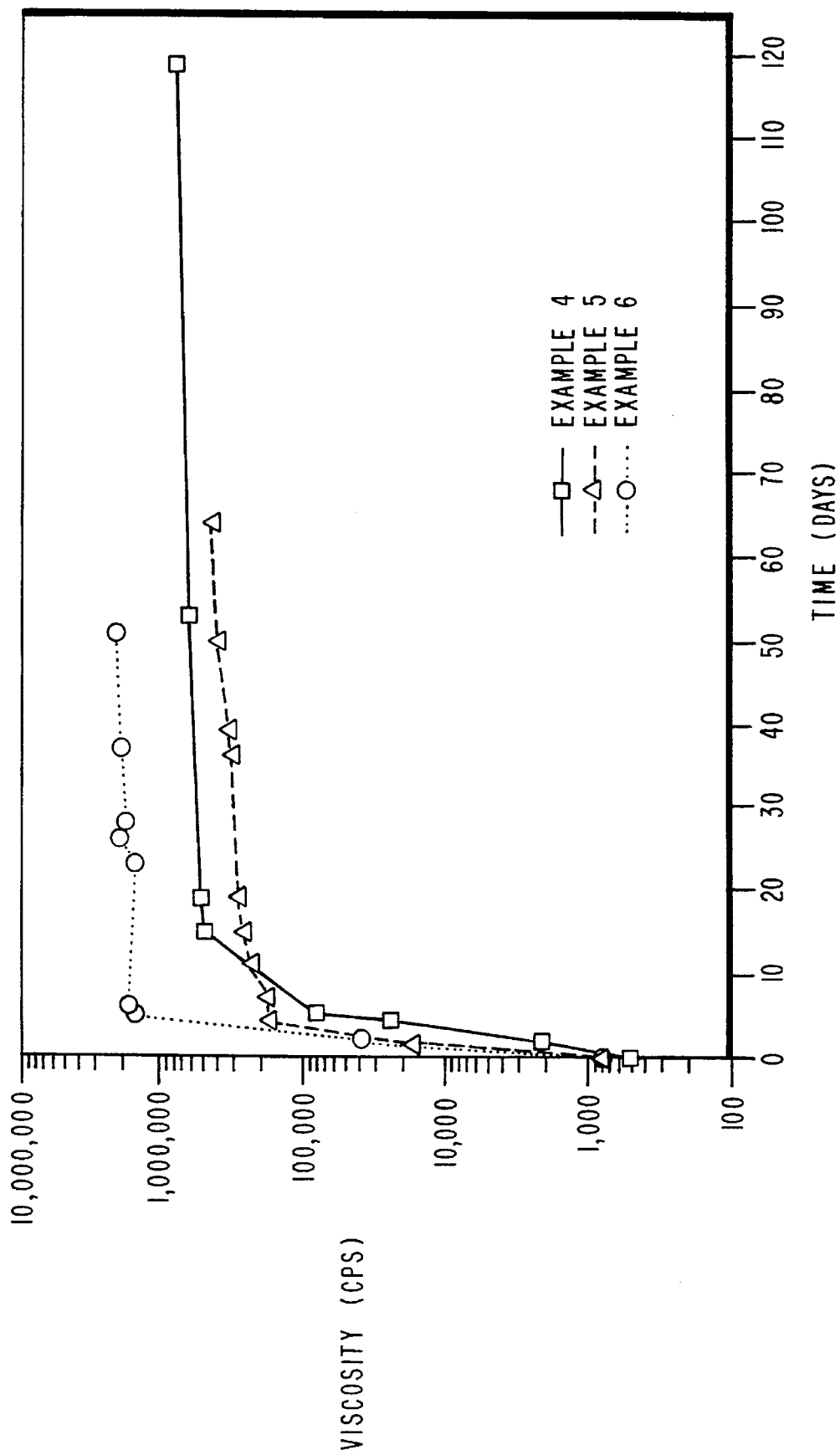
FIG. 2 is a graphical illustration of the viscosity profiles (viscosity vs. time) of the compositions described in Examples 4–6.

A 3.0 g portion of DY-9577 was heated in a 200 ml beaker at 40°–50° C. for ten minutes to produce a liquid. To the liquid were added 36 g of DER 383, 18 g of DER-732, 8 g of CY-179, and a 10 g solution of 97% methyltetrahydrophthalic anhydride and 3% triphenylphosphine at room temperature with subsequent mixing. The resulting solution had an initial viscosity of 520 cp at room temperature. The plateau viscosity was 528,000 cp after 16 days at room temperature, a suitable viscosity for filament winding when impregnated on fiber. Viscosity profile of this resin is shown in FIG. 2 (with the symbol □). The pot-life of this system is about 20 hours.

Example 5

A 2.5 g portion of DY-9577 was heated in a 200 ml beaker at 40°–50° C. for ten minutes to produce a liquid. To the liquid were added 50 g of CY-184, and a 8.5 g solution of 97% methyltetrahydrophthalic anhydride and a 3% triphenylphosphine at room temperature with subsequent mixing. The resulting solution had an initial viscosity of 850 cp at room temperature and a viscosity of 1,270 cp, after 6 hours at room temperature. It had a pot-life of about 6 hours. The plateau viscosity was 184,400 cp after 5 days at room temperature, a suitable viscosity for filament winding when impregnated with fiber. Viscosity profile of this resin is shown in FIG. 2 (with the symbol △).

Example 6

A 2.5 g portion of DY-9577 was heated in a 200 ml beaker at 40°–50° C. for ten minutes to obtain a liquid. To this liquid were added 50 g of CY-184 and a 10 g solution of 97% methyltetrahydrophthalic anhydride and a 3% triphenylphosphine at room temperature with subsequent mixing. The resulting solution had an initial viscosity of 830 cp at room temperature and a viscosity of 1,340 cp, after 6 hours at room temperature. It had a pot-life of about 6 hours. The plateau viscosity was 1,624,000 cp after 6 days at room temperature, a viscosity suitable for filament winding when impregnated with fiber. Viscosity profile of this resin is shown in FIG. 2 (shown with the symbol o).

Example 7

A 30 g portion of DY-9577 was heated in a 2 liter beaker at 40°–50° C. for 20 minutes to obtain a liquid. To the liquid were added 600 g of CY-184, 84 g of nadic methyl anhydride, and 6 g of 2-ethyl-4-methylimidazole at room temperature with subsequent mixing. Prepreg tow was made using T-1000G 12K carbon fiber (manufactured by Toray Industries) by the pressure-roller method with resin contents of 29.5 to 30.9 weight percent. After storage at room temperature for 11 days, the prepreg tow was used to wind three 7.5-inch long, 5.75-inch diameter pressure vessels. Burst-testing of the three bottles showed that this formulation gave a tow strength translation of 80.6% and a coefficient of variation (C.V.) of 4.9%.

Example 8

A 30 g portion of DY-9577 was heated in a 2 liter beaker at 40°–50° C. for 20 minutes to obtain a liquid. To the liquid was added 600 g of CY-184, and a 140 g solution of 97% methyltetrahydrophthalic anhydride and a triphenylphosphine at room temperature with subsequent mixing. The prepreg tow was made using T-1000G 12K carbon fiber by the pressure-roller method with resin contents of 26.9 to 33.5 weight percent. After storage at room temperature for 12 days, the prepreg tow was used to wind three 7.5-inch long, 5.75-inch diameter pressure vessels. Burst-testing of the three bottles showed that this formulation gave a tow strength translation of 90.9% and a C.V. of 1.6%.

Example 9

A 38.5 g portion of DY-9577 was heated in a 2 liter beaker at 40°–50° C. for 20 minutes to obtain a liquid. To the liquid was added 500 g of CY-184, 100 9 of DEN-431, and a 140 g solution of 97% nadic methyl anhydride and 3% triphenylphosphine at room temperature with subsequent mixing. Prepreg tow was made using T-1000G carbon fiber by the pressure-roller method with resin contents of 27.6 to 32.3 weight percent. After storage at room temperature for 11 days, the prepreg tow was used to wind three 7.5-inch long, 5.75-inch diameter pressure vessels. Burst-testing of the three bottles showed that this formulation gave a tow strength translation of 83.8% and a C.V. of 3.4%.

Table 1, below, sets forth the chemorheologically viscosity tailored matrix resin formulations of Examples 1–9.

Figure 3:
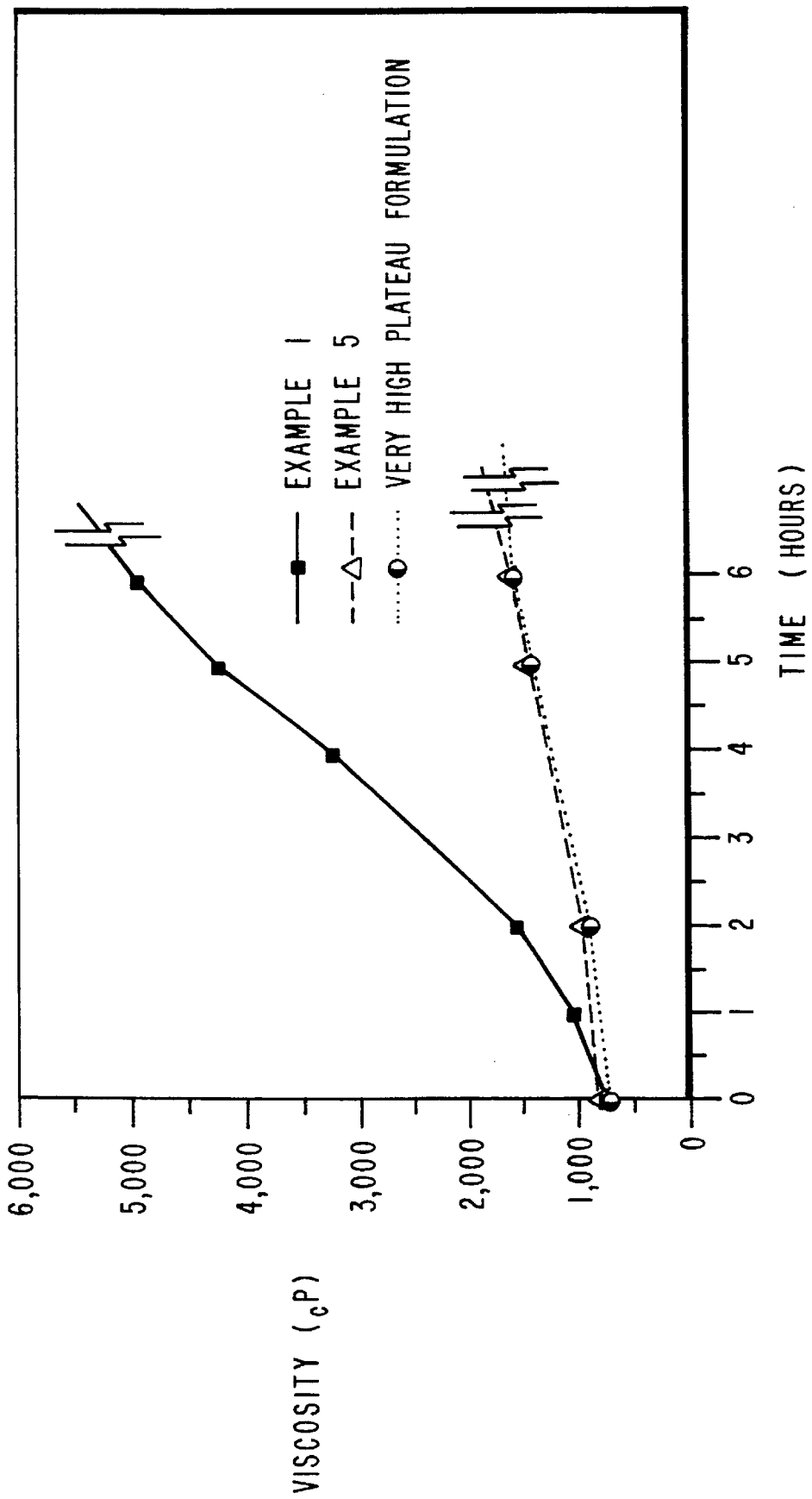
FIG. 3 is a graphical illustration of viscosity profile showing the effective pot-life for the compositions described in Examples 1 and 5 and a formulation which gave a plateau viscosity outside the range useful for filament winding.

From the foregoing examples, it will be appreciated that the chemorheologically viscosity tailored resin formulations of the present invention containing an anhydride reactive curing agent have longer pot-lives than comparable resin formulations containing an amine reactive curing agent. A pot-life comparison between the anhydride and amine resin formulations is shown in FIG. 3. The pot-life of an amine resin formulation (Example 1), formulated for a plateau viscosity of 300,000 cp within 7–10 days, is 2 hours compared to 6 hours for the corresponding anhydride resin formulation (Example 5). Adequate fiber impregnation with a resin formulation that has a 2 hour pot-life would require special processes such as continuous resin component metering through a static mixer.

FIG. 3 also illustrates an anhydride resin formulation designed to obtain a plateau viscosity of 100 million cp within 7–10 days which has a pot-life of 6 hours. A resin formulation which obtains such high plateau viscosities while maintaining a useful pot-life is a significant result.

From the foregoing, it will also be appreciated that the present invention provides a chemorheologically viscosity tailored resin formulation that passes through the desired viscosity profile at room temperature and does so without

TABLE 1

| | Composition of Examples, parts by weight | | | | | | | | |
|---|---|---|---|---|---|---|---|---|---|
| | 1 | 2 | 3 | 4 | 5 | 6 | 7 | 8 | 9 |
| DY-9577 | 2.5 | 2.5 | 3.6 | 3.0 | 2.5 | 2.5 | 30 | 30 | 38.5 |
| CY-184 | 50.0 | 50.0 | — | — | 50.0 | 50.0 | 600 | 600 | 500 |
| CY-179 | — | — | 8.0 | 8.0 | — | — | — | — | — |
| MY-510 | — | — | 60.0 | — | — | — | — | — | — |
| DER-383 | — | — | — | 36.0 | — | — | — | — | — |
| DER-732 | — | — | — | 18.0 | — | — | — | — | — |
| DEN-431 | — | — | — | — | — | — | — | — | 100 |
| MTHPA | — | 8.5 | 10.9 | 9.7 | 8.2 | 9.7 | — | 135.8 | — |
| NMA | — | — | — | — | — | — | 84 | — | 135.8 |
| Ph$_3$P | — | — | 0.3 | 0.3 | 0.3 | 0.3 | — | 4.2 | 4.2 |
| 2,4-EMI | — | — | — | — | — | — | 6 | — | — |
| IPD | 3.0 | — | — | — | — | — | — | — | — |

DY-9577: born trichloride-amine complex (Ciba-Geigy)
CY-184: cycloaliphatic epoxy (Ciba-Geigy)
CY-179: cycloaliphatic epoxy (Ciba-Geigy)
MY-510: 4-glycidyloxy-N,N-diglycidylaniline (Ciba-Geigy)
DER-383: diglycidyl ether of bisphenol A (Dow Chemical)
DER-732: polyglycol diglycidyl ether (Dow Chemical)
DEN-431: novolac epoxy (Dow Chemical)
MTHPA: methyltetrahydrophthalic anhydride (Anhydride & Chem)
NMA: nadic methyl anhydride (Anhydride & Chem.)
Ph$_3$P: triphenylphosphine (Aldrich Chemicals)
2,4-EMI: 2-ethyl-4-methylimidazole (Air Products)
IPD: isophorone diamine (Huls AG)

Table 2, below, compares the burst performance of pressure vessels fabricated from prepregs described in Examples 7–9. The tow strength translation and coefficient of variation are given.

TABLE 2

| Tow Strength Translation and C.V. of Examples | | |
|---|---|---|
| Example | Translation (%) | C.V. (%) |
| 7 | 80.6 | 4.9 |
| 8 | 90.9 | 1.6 |
| 9 | 83.8 | 3.4 | requiring solvent dilution or hot-melt impregnation of fibers. The present invention permits the formed prepreg to be spooled at room temperature immediately after impregnation of the fibers, without requiring either solvent removal or cooling of the prepreg. The present invention further provides a prepreg composition that has a predetermined viscosity plateau which remains substantially unchanged upon room temperature storage. This allows for a long term room temperature storage of the prepreg and also for a long-working-life with constant yet tailorable tack and drape. The prepreg compositions of the present invention, when used to form a composite article, achieve a viscosity minimum and then gel, cure, or harden like typical prepregs. Also, it will be appreciated that the present invention enables the matrix processing viscosity to be controlled by chemical formulation rather than by solvents or heated impregnation equipment.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An incompletely cured prepreg composition comprising fibers impregnated with a chemorheologically viscosity tailored matrix resin formulation containing a curable matrix resin and an effective amount of a reactive curing agent reactive at room temperature and a latent curing agent substantially nonreactive at room temperature but activated upon heating or radiation, said reactive curing agent including at least one anhydride functional group, said prepreg composition having a plateau viscosity which remains substantially unchanged upon room temperature storage of the composition for at least thirty days, wherein said plateau viscosity is greater than approximately 50,000 cp.

2. An incompletely cured prepreg composition as defined in claim 1, wherein the fibers are in the form of a tow, roving, tape, mat, fabric, or broadgood.

3. An incompletely cured prepreg composition as defined in claim 1, wherein the resin has a room temperature viscosity plateau greater than 300,000 cp.

4. An incompletely cured prepreg composition as defined in claim 1, wherein the curable matrix resin comprises epoxy resins.

5. An incompletely cured prepreg composition as defined in claim 1, wherein the reactive curing agent is selected from the group consisting of aliphatic, cycloaliphatic, and aromatic anhydrides.

6. An incompletely cured prepreg composition as defined in claim 1, wherein the reactive curing agent is selected from the group consisting of methyltetrahydrophthalic anhydride, nadic methyl anhydride, methylhexahydrophthalic anhydride, and maleic anhydride.

7. An incompletely cured prepreg composition as defined in claim 1, wherein the latent resin curing agent is selected from the group consisting of a boron trifluoride complex, a boron trichloride complex, and tertiary amines and their salts, and imidazoles.

8. An incompletely cured prepreg composition as defined in claim 1, wherein the latent resin curing agent is a blocked Lewis acid epoxy curing agent.

9. An incompletely cured prepreg composition as defined in claim 1, wherein the curing agents are present in an amount of from about 5% to about 30% by weight based on the weight of curable matrix resin.

* * * * *